United States Patent
Huang et al.

(10) Patent No.: US 9,489,836 B2
(45) Date of Patent: Nov. 8, 2016

(54) CONTROL SYSTEM AND PASSIVE DEVICE CONTROL METHOD

(71) Applicant: Primax Electronics Ltd., Neihu, Taipei (TW)

(72) Inventors: Ying-Jieh Huang, Taipei (TW);
Sheng-Ling Huang, Taipei (TW);
Po-Wen Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 28 days.

(21) Appl. No.: 14/723,110

(22) Filed: May 27, 2015

(65) Prior Publication Data

US 2016/0189535 A1 Jun. 30, 2016

(30) Foreign Application Priority Data

Dec. 24, 2014 (CN) .......................... 2014 1 0814960

(51) Int. Cl.
*G08C 17/02* (2006.01)
*G06F 3/0484* (2013.01)
*G06F 3/0482* (2013.01)
*G05B 15/02* (2006.01)

(52) U.S. Cl.
CPC .............. *G08C 17/02* (2013.01); *G05B 15/02* (2013.01); *G06F 3/0482* (2013.01); *G06F 3/04847* (2013.01); *G06F 3/0484* (2013.01)

(58) Field of Classification Search
CPC . G08C 17/02; G06F 3/04847; G06F 3/0484; G06F 3/0482; G06F 17/30876; G06F 17/30247; H04W 4/16; H04W 4/008; G05B 15/02; G08G 1/0965; H04L 12/2816; H04L 12/282; G08B 21/22
USPC .................................................. 340/12.5, 628
See application file for complete search history.

(56) References Cited

U.S. PATENT DOCUMENTS

| | | | | |
|---|---|---|---|---|
| 8,594,850 B1 * | 11/2013 | Gourlay | ................. | G05B 15/02 165/11.1 |
| 2015/0061895 A1 * | 3/2015 | Ricci | ...................... | H04W 4/22 340/902 |
| 2016/0065666 A1 * | 3/2016 | Kim | ..................... | H04L 67/1051 709/203 |

* cited by examiner

*Primary Examiner* — Ali Neyzari
(74) *Attorney, Agent, or Firm* — Kirton McConkie; Evan R. Witt

(57) ABSTRACT

A control system includes a server, an active device and a passive device. An operation interface information is stored in the server. The active device is wirelessly connected with the passive device according to a communication identification information. When a device information of the passive device is acquired by the active device, a control application program of the active device retrieves the operation interface information from the server according to the device information. Consequently, an operation interface corresponding to the operation interface information is displayed on the active device. By operating the operation interface, the passive device is correspondingly controlled.

17 Claims, 10 Drawing Sheets

CONTROL SYSTEM AND PASSIVE DEVICE CONTROL METHOD

FIELD OF THE INVENTION

The present invention relates to a control system, and more particularly to a control system using an active device to control a passive device.

BACKGROUND OF THE INVENTION

Generally, a home appliance is usually equipped with a control panel or plural control buttons. The user may operate the control panel or the control buttons to control the home appliance. As known, there are certain distances between the locations of some home appliances and the user's location. For example, the air conditioner is located at a higher altitude or the television set is far away from the sofa, and so on. For facilitating the user to control the home appliance, the manufacturer usually designs an exclusive remote controller for the home appliance. By using the remote controller, the user can control the home appliance at a remote site.

However, the control panels or the control buttons of the remote controllers designed by different manufacturers are not always identical. Moreover, the control panel layout or the control button layout is usually restricted by the volume of the remote controller. In other words, the utilization of the remote controller is limited. Moreover, if the manufacturer finds that the layout of the remote controller is no longer popular, the manufacturer is usually unwilling to design and produce a more user-friendly remote controller because the cost of producing the new remote controller is high. Until the next generation home appliance is about to be introduced to the market, the remote controller with the new layout is correspondingly produced so as to achieve the cost-effective benefit. Since this approach of designing the new remote controller takes a certain time period, the user does not want to wait but prefers selecting the home appliances of other manufacturers. Under this circumstance, the customer loss rate increases.

Recently, with increasing development of science and technology, home appliances and other electronic devices have evolved to the intelligent appliances. In particular, most home appliances have a network connection function and can be used with portable electronic devices. For example, in case that an air conditioner in a house has the network connection function, the air conditioner can be connected with the user's smart phone through network connection. If an exclusive application program for the air conditioner is installed in the smart phone, the user may operate the application program of the smart phone to control the operations of the air conditioner through network transmission. For example, if the air conditioner is turned on in advance before the user comes back to the house, the pre-cooling efficacy is achieved. Under this circumstance, the user can control the home appliance without the need of using the exclusive remote controller.

However, the above control method still has some drawbacks. For example, if the user wants to operate the smart phone to control the television set, the user has to previously download and the application program for the television set. Similarly, if the user wants to operate the smart phone to control the air conditioner, the user has to previously download and the application program for the air conditioner. In other words, the number of home appliances that are controlled by the smart phone is dependent on the same number of application programs installed on the smart phone. It is time-consuming and labor-intensive for the user to sequentially download many application programs. Moreover, for implementing the above control method, the controlled home appliances should have the network connection function.

Therefore, there is a need of providing a control system for controlling plural passive devices without the need of previously installing many application programs for the passive devices.

SUMMARY OF THE INVENTION

A first object of the present invention provides a control system capable of controlling plural passive devices without the need of previously installing many application programs for the passive devices.

A second object of the present invention provides a control system capable of controlling plural passive devices without the need of using many application programs for the passive devices.

A third object of the present invention provides a control system for allowing a passive device to access the resources of the internet by wirelessly connecting the passive device with an active device.

A fourth object of the present invention provides a control system for allowing a passive device to transmit a fault diagnosis message to the internet by wirelessly connecting the passive device with an active device.

A fifth object of the present invention provides a control system for allowing a passive device to access a firmware update information of an internet or a server by wirelessly connecting the passive device with an active device.

In accordance with an aspect of the present invention, there is provided a control system. The control system includes a passive device, a server and an active device. The passive device has a communication identification information. The server stores an operation interface information corresponding to the passive device. The active device is wirelessly connected with the passive device and connected with the server through network connection. The active device retrieves the operation interface information from the server according to a device information of the passive device. The active device includes a display screen and an input part. An operation interface corresponding to the operation interface information is displayed on the display screen. The passive device is controlled by the active device in response to an input operation on the input part.

In accordance with another aspect of the present invention, there is provided a passive device control method. The passive device control method includes a wireless connection step, an operation interface acquiring step and a controlling step. Firstly, the wireless connection step is performed to allow an active device to be wirelessly connected with the passive device according to a communication identification information. Then, the operation interface acquiring step is performed. The active device retrieves an operation interface information corresponding to the passive device from a server through network connection according to a device information corresponding to the passive device. An operation interface corresponding to the operation interface information is displayed on the active device. Then, the controlling step is performed to allow the active device to output an input signal in response to an input operation on the operation interface. The passive device is controlled according to the input signal.

The above objects and advantages of the present invention will become more readily apparent to those ordinarily

DETAILED DESCRIPTION OF THE PREFERRED EMBODIMENT

For obviating the drawbacks of the prior art technologies, the present invention provides a control system and a passive device control method.

Figure 1:
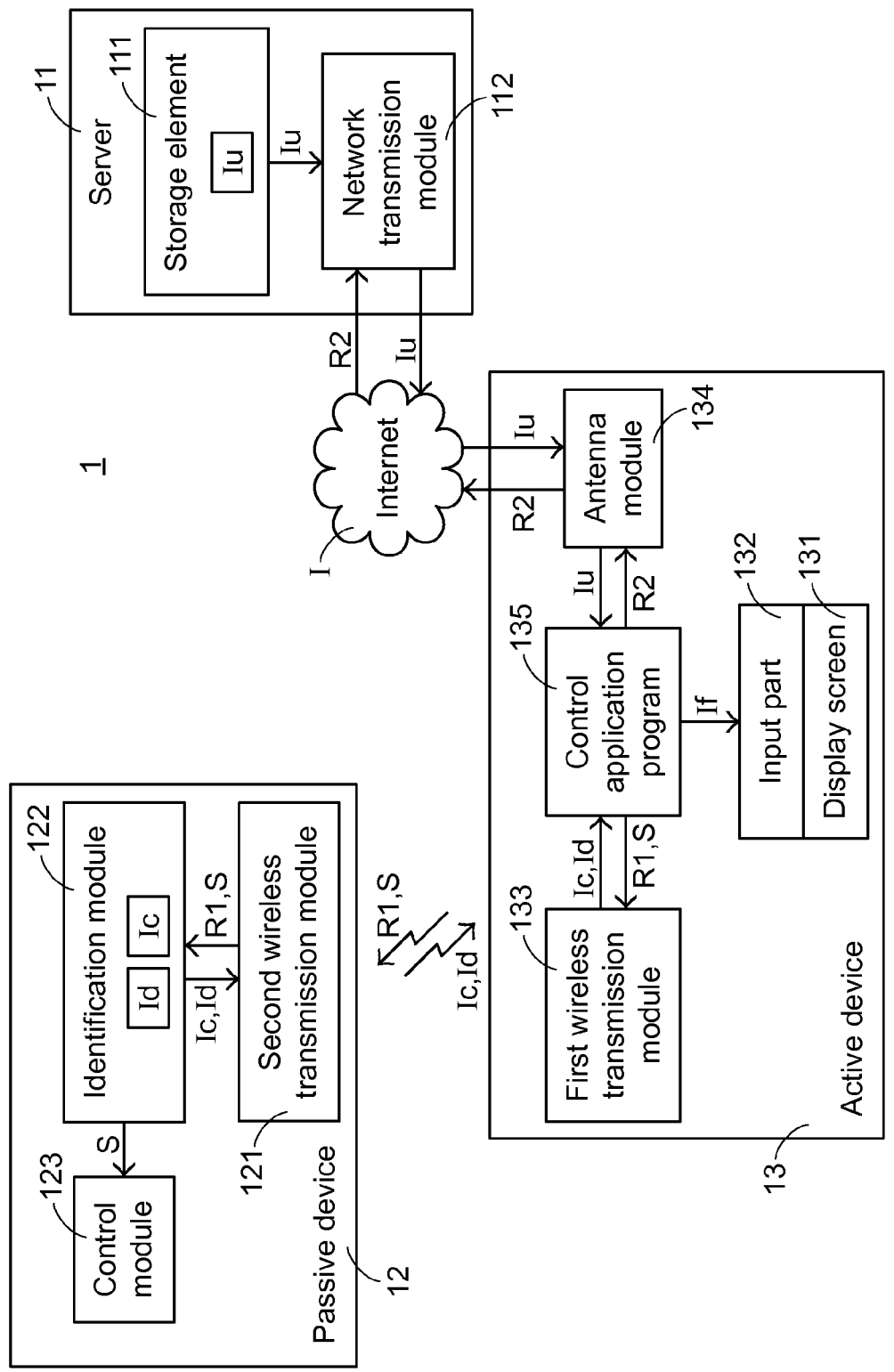
FIG. 1 is a schematic functional block diagram illustrating the architecture of a control system according to a first embodiment of the present invention.

Hereinafter, the architecture of a control system of the present invention will be illustrated with reference to FIG. 1. FIG. 1 is a schematic functional block diagram illustrating the architecture of a control system according to a first embodiment of the present invention. As shown in FIG. 1, the control system 1 comprises a server 11, a passive device 12 and an active device 13. A communication identification information Ic and a device information Id are previously stored in the passive device 12. The passive device 12 outputs one communication identification information Ic at a specified time interval (e.g. 5 seconds). The server 11 comprises a storage element 111 and a network transmission module 112. An operation interface information Iu corresponding to the passive device 12 is stored in the storage element 111. The network transmission module 112 is connected with the storage element 111. The network transmission module 112 is in connected with the active device 13 through network connection by a network transmission technology. In an embodiment, the passive device 12 is an air conditioner, and the storage element 111 is a hard disk.

As shown in FIG. 1, the active device 13 is wirelessly connected with the passive device 12, and the active device 13 is connected with the server 11 through network connection. In this embodiment, the active device 13 comprises a display screen 131, an input part 132, a first wireless transmission module 133, an antenna module 134 and a control unit (not shown). The control unit may execute a control application program 135. The display screen 131 is exposed outside the active device 13. An operation interface If corresponding to the operation interface information Iu is displayed on the display screen 131. In response to an input operation of the user on the input part 132, the passive device 12 is correspondingly controlled. An example of the active device 13 includes but is not limited to a smart phone, a tablet computer, a personal digital assist (PDA) or any other appropriate electronic device. In this embodiment, the display screen 131 and the input part 132 are combined as an integral touch screen. The examples of the above components are presented herein for purpose of illustration and description only. In another embodiment, the display screen is a display panel, and the input part comprises physical keys.

The components of the active device 13 will be illustrated in more details as follows. The first wireless transmission module 133 is disposed within the active device 13. The first wireless transmission module 133 is wirelessly connected with the passive device 12 by a wireless transmission technology. In addition, the first wireless transmission module 133 may receive the communication identification information Ic and the device information Id from the passive device 12. The antenna module 134 is disposed within the active device 13. The antenna module 134 is connected with the internet I by a network transmission technology and connected with the server 11 via the internet I through network connection. The antenna module 134 may receive the operation interface information Iu from the server 11. The control unit is connected with the display screen 131, the input part 132, the first wireless transmission module 133 and the antenna module 134. The control application program 135 of the control unit is executed to control the operations of the display screen 131, the input part 132, the first wireless transmission module 133 and the antenna module 134. The detailed operations will be described later. In an embodiment, the first wireless transmission module 133 is a Bluetooth transmission module, the antenna module 134 is a Wi-Fi module, and the control application program 135 is downloaded from a Web apps store and installed in the active device 13. It is noted that the way of installing the control application program is not restricted. In some other embodiments, the control application program is previously stored in the active device. Alternatively, the control application program is stored in a storage device. When the storage device is connected with the active device, the control application program is transmitted to the active device and installed in the control application program.

The passive device 12 comprises a second wireless transmission module 121, an identification module 122 and a control module 123. The identification module 122 is connected with the second wireless transmission module 121. The communication identification information Ic and the device information Id are previously stored in the identification module 122. Moreover, the identification module 122 outputs one communication identification information Ic at the specified time interval. Moreover, in response to a first retrieve request R1 corresponding to the device information Id and from the active device 13, the identification module 122 outputs the device information Id. The second wireless transmission module 121 is disposed within the passive device 12. The second wireless transmission module 121 may be wirelessly connected with the first wireless transmission module 133 by the wireless transmission technology, and the communication identification information Ic from the identification module 122 may be transmitted through the second wireless transmission module 121. Moreover, when the active device 13 is operated by the user to output an input signal S, the input signal S may be received by the second wireless transmission module 121. The control module 123 is connected with the identification module 122. According to the input signal S, the control module 123 performs a corresponding operation. In this embodiment, the passive device 12 is an air conditioner, the second wireless transmission module 121 is also a Bluetooth transmission module, and the identification module 122 and the control module 123 are independent control circuits or control chips.

The following three aspects should be specially described. Firstly, the passive device 12 is not equipped with a control panel or a control button. Consequently, the user cannot directly control the passive device 12. That is, the user has to operate the active device 13 to control the passive device 12.

Secondly, the communication identification information Ic in the identification module 122 contains the device name and associated wireless transmission information of the passive device 12. When the passive device 12 is detected by the active device 13, the wireless connection between the active device 13 and the passive device 12 is established through the communication identification information Ic.

Thirdly, the device information Id in the identification module 122 contains the device identification information corresponding to the passive device 12, the current status information corresponding to the passive device 12 and the address information corresponding to the server 11. The device identification information contains the universally unique identifier (UUID) of the passive device 12 and the product serial number that is assigned to the passive device 12 by the manufacturer. When the device information Id is received by the active device 13, the antenna module 134 is connected with the server 11 through network connection according to the address information under control of the control application program 135. Moreover, according to the product serial number in the device information Id, the control application program 135 allows the server 11 to search the operation interface information Iu corresponding to the product serial number. In other words, the control application program 135 retrieves the corresponding operation interface information Iu from the server 11 according to the device identification information and the address information.

Figure 2:
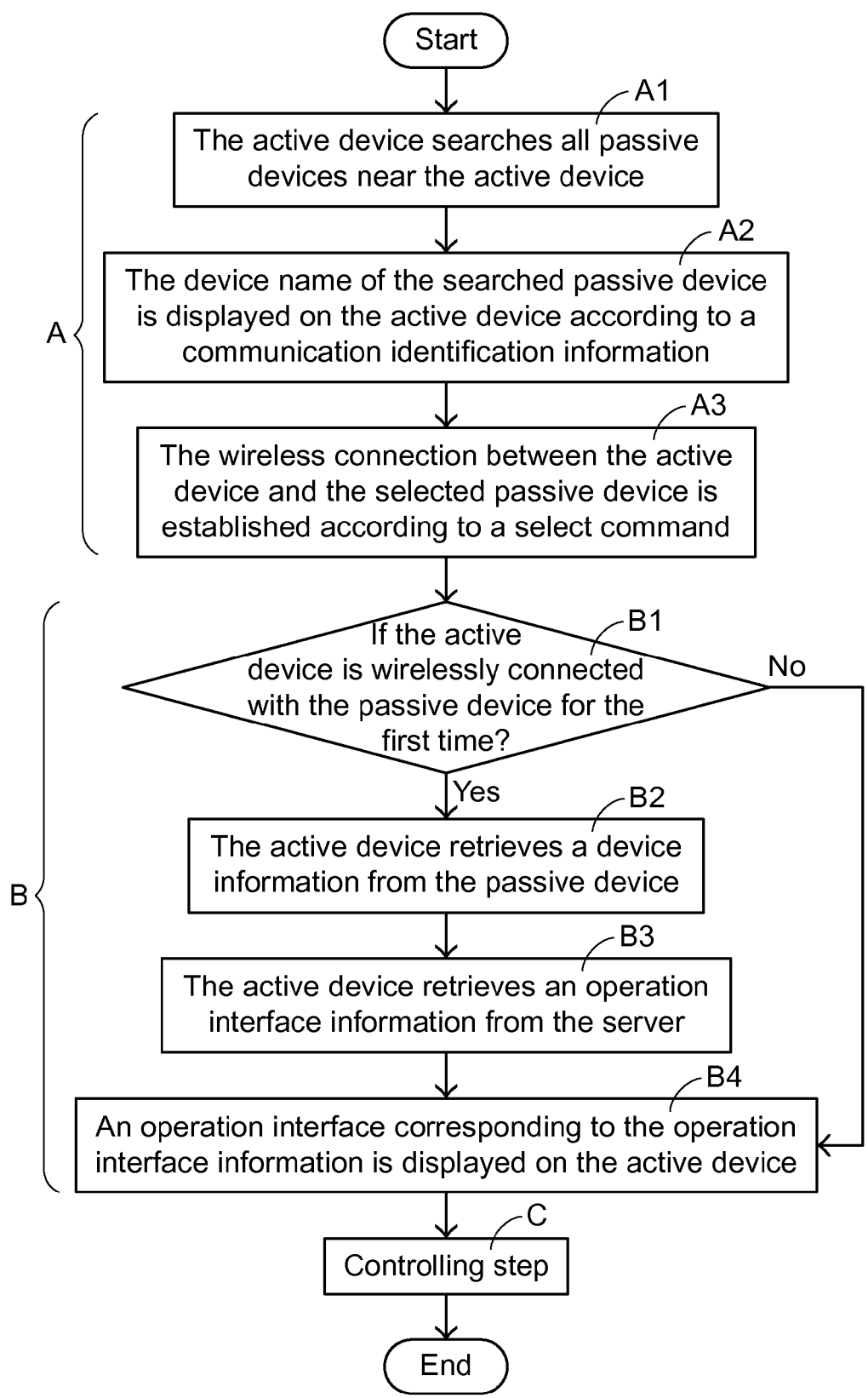
FIG. 2 is a flowchart illustrating a passive device control method according to a first embodiment of the present invention.

Hereinafter, a passive device control method according to a first embodiment of the present invention will be illustrated with reference to FIG. 2. FIG. 2 is a flowchart illustrating a passive device control method according to a first embodiment of the present invention. The passive device control method of the present invention comprises a wireless connection step A, an operation interface acquiring step B and a controlling step C.

The wireless connection step A comprises the following steps A1, A2 and A3. In the step A1, the active device searches all passive devices near the active device. In the step A2, the device name of the searched passive device is displayed on the active device according to a communication identification information. In a step A3, according to a select command, the wireless connection between the active device and the selected passive device is established.

The operation interface acquiring step B comprises the following steps B1, B2, B3 and B4. The step B1 is performed to judge whether the active device is wirelessly connected with the passive device for the first time. In the step B2, the active device retrieves a device information from the passive device. In the step B3, the active device retrieves an operation interface information from the server. In the step B4, an operation interface corresponding to the operation interface information is displayed on the active device. In the controlling step C, the active device controls the passive device in response to an input operation of the user.

If the judging result of the step B1 indicates that the active device is wirelessly connected with the passive device for the first time, the step B2 is performed. Whereas, if the judging result of the step B1 indicates that the active device is wirelessly connected with the passive device not for the first time, the step B4 will be performed.

The operations of the passive device control method of the present invention will be illustrated in more details as follows. Please refer to FIGS. 1 and 2. Before the passive device control method of the present invention, two preliminary steps are performed. Firstly, the operation interface information Iu corresponding to the passive device 12 is stored in the storage element 111 of the server 11. Secondly, the identification module 122 is programmed to output one communication identification information Ic at a specified time interval. After the preliminary steps are completed, the passive device control method of the present invention is started. After the active device 13 is activated by the user, the control application program 135 performs the step A1 of controlling the active device 13 to search the passive device 12 near the active device 13 through the first wireless transmission module 133. As mentioned above, the communication identification information Ic is periodically outputted from the identification module 122. Consequently, when the communication identification information Ic is received by the first wireless transmission module 133 in the searching process, the communication identification information Ic is transmitted to the control application program 135 and the communication identification information Ic is read by the control application program 135. Then, the device name in the communication identification information Ic (e.g. "Air conditioner XX01") is displayed on the display screen 131 under control of the control application program 135. That is, the step A2 is performed.

By the way, the above two preliminary steps are performed by the manufacturer during the process of manufacturing the server 11 and the passive device 12. That is, the above two preliminary steps are not set by the user. It is noted that numerous modifications and alterations may be made while retaining the teachings of the invention. For example, according to the special requirements, the advanced user may operate a third-party device to access the server and the passive device and manually perform the above two preliminary steps so as to meet the special requirements.

Since only the communication identification information Ic from the passive device 12 is received by the first wireless transmission module 133 in the searching process, only the device name corresponding to the passive device 12 is displayed on the display screen 131. Via the input part 132, the user may perform a select operation of selecting the device name of the passive device 12. In this embodiment, the select operation is done by touching the input part 132. In response to the user's select operation, the first wireless transmission module 133 is wirelessly connected with the second wireless transmission module 121 under control of the control application program 135. Consequently, the wireless connection between the active device 13 and the passive device 12 is established. That is, the step A3 is performed. Meanwhile, the wireless connection step A is completed.

In this embodiment, the control application program 135 establish the wireless connection in response to the select operation of the user. It is noted that numerous modifications and alterations may be made while retaining the teachings of the invention. In another embodiment, if the control application program judges that only one communication identification information is received, the control application program will establish the wireless connection between the active device and the passive device without the need of waiting for the select command in response to the user's select operation.

Figure 3:
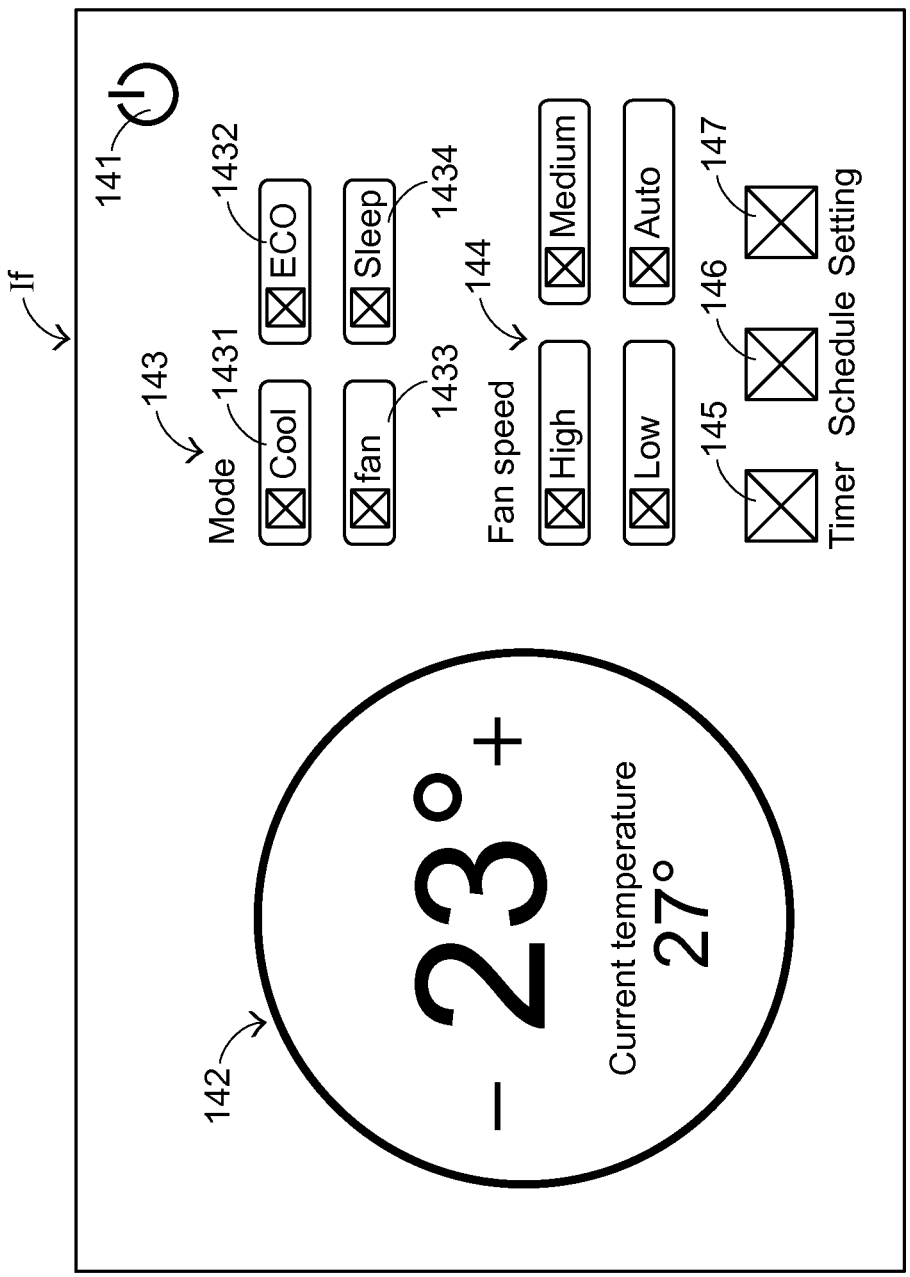
FIG. 3 schematically illustrates an operation interface displayed on the active device of the control system according to the first embodiment of the present invention.

Then, the control application program 135 performs the operation interface acquiring step B. Please refer to FIGS. 1~3. FIG. 3 schematically illustrates an operation interface displayed on the active device of the control system according to the first embodiment of the present invention. Firstly, the control application program 135 performs the step B1 of judging whether the active device 13 is wirelessly connected with the passive device 12 for the first time. Since no record about the wireless connection between the active device 13 and the passive device 12 is searched from the active device 13 by the control application program 135, the control application program 135 judges that the active device 13 is wirelessly connected with the passive device 12 for the first time and then the step B2 is performed. In the step B2, a first retrieve request R1 corresponding to the device information Id is outputted from the control application program 135 to the passive device 12 through the first wireless transmission module 133. On the other hand, after the first retrieve request R1 is received by the passive device 12, the device information Id is transmitted from the identification module 122 to the active device 13 through the second wireless transmission module 121. The device information Id contains the device identification information corresponding to the passive device 12, the current status information corresponding to the passive device 12 and the address information corresponding to the server 11.

In other words, after the device information Id is received by the control application program 135, the control application program 135 not only acquires the current status information of the passive device 12 (e.g., a fan mode, a cool mode or other operating status) but also acquires the device identification information and the address information of the server 11.

Then, the step B3 is performed. According to the device identification information corresponding to the passive device 12 and the address information corresponding to the server 11, the control application program 135 controls the antenna module 134 to issue a second retrieve request R2 corresponding to the operation interface information Iu. Consequently, the second retrieve request R2 is transmitted to the server 11 through the internet I. The second retrieve request R2 contains the device identification information of the passive device 12. On the other hand, after the server 11 receives the second retrieve request R2, the server 11 can realize the product serial number that is assigned to the passive device 12 by the manufacturer according to the device identification information of the passive device 12. Consequently, the operation interface information Iu corresponding to the passive device 12 is searched from the storage element 111 by the server 11, and the operation interface information Iu is transmitted to the active device 13 through the network transmission module 112. The operation interface information Iu contains the operation interface If corresponding to the passive device 12 and associated information.

After the control application program 135 receives the operation interface information Iu, the control application program 135 performs the step B4. In the step B4, the control application program 135 reads the operation interface information Iu. Consequently, the control application program 135 acquires the operation interface If corresponding to the passive device 12 and controls the display screen 131 to display the operation interface If. At the same time, the current status information corresponding to the passive device 12 is also displayed on the operation interface If. The contents of the operation interface If are shown in FIG. 3. Meanwhile, the operation interface acquiring step B is completed. Afterwards, in response to the user's input operation on the operation interface If, the control application program 135 performs the controlling step C. That is, in response to the user's input operation on the operation interface If, the active device 13 issues an input signal S to the passive device 12. According to the input signal S, the passive device 12 is controlled to perform the corresponding operation.

A method of operating the operation interface If by the user will be illustrated as follows. Please refer to FIG. 3 again. The operation interface If contains a power option 141, a temperature display field 142, a mode status field 143, a fan speed field 144, a timer option 145, a schedule setting option 146 and a setting option 147. The function of the power option 141 is similar to a power switch. By tapping the power option 141, the passive device 12 is controlled to be turned on or turned off. The current room temperature and the target temperature are displayed on the temperature display field 142. The mode status field 143 provides plural operation modes to be selected by the user. The mode status field 143 contains a cool mode option 1431, a power-saving mode option (ECO) 1432, a fan mode option 1433 and a sleep mode option 1434. When one of the above operation mode options is selected by the user, the passive device 12 enters the corresponding operation mode immediately. The above operation modes are the well-known operation modes of the conventional air conditioner, and are not redundantly described herein.

The fan speed field 144 provides plural fan speeds of the passive device 12 to be adjusted. The fan speed field 144 contains plural fan speed options. Through the timer option 145, the user may set a specified time period (e.g., 30 minutes), and thus the passive device 12 is automatically turned off after the specified time period (e.g., 30 minutes). Through the schedule setting option 146, the user may set a specified data and a specified time interval to turn on the passive device 12. Through the setting option 147, the user may mark various settings of the passive device 12, for example the target temperature or the power consumption rate of the passive device 12. By viewing the contents of the operation interface If displayed on the display screen 131, the user can realize the current operation status of the passive device 12. Of course, by tapping or triggering the plural options 141~147 of the operation interface If through the input part 132, the user can allow the passive device 12 to perform the corresponding operation. That is, the controlling step C is performed. Moreover, in the active device 13, the control application program 135 analyzes the user's input operation through the input part 132 and generates the corresponding input signal S according to the analyzing result. Moreover, the input signal S is transmitted to the passive device 12 through the first wireless transmission module 133. According to the input signal S, the control module 123 of the passive device 12 performs the corresponding operation.

The method of operating the active device 13 to control the passive device 12 for the first time has been mentioned as above. In case that the user operates the active device 13 to control the passive device 12 for the next time, the control application program 135 will perform the step A1, the step A2, the step A3, the step B1, the step B4 and the step C sequentially. That is, the passive device control method of the present invention can be successfully implemented without the need of allowing the control application program 135 to retrieve the operation interface information Iu of the passive device 12 again.

In this embodiment, while the passive device 12 performs the corresponding operation according to the input signal S, the active device 12 does not report back the operating result to the active device 13. For example, if the user wants to decrease the temperature of the passive device 12 by 2° C., the user may operate the active device 13 to transmit the input signal S to the passive device 12 in the controlling step C, wherein the input signal S contains the input command corresponding to the 2° C. temperature decrease. Under this circumstance, the passive device 12 only decreases the temperature of the passive device 12 according to the input signal S but does not report back the operating result to the active device 13. This example is presented herein for purpose of illustration and description only.

It is noted that numerous modifications and alterations may be made while retaining the teachings of the invention. In another embodiment, if the input signal S containing the input command corresponding to the 2° C. temperature decrease is transmitted from the active device to the passive device, the passive device performs a corresponding operation of decreasing the temperature by 2° C. according to the input signal and transmits a report signal back to the active device. Consequently, a message indicating the completion of the 2° C. temperature decrease will be displayed on the operation interface of the display screen. Accordingly, the user can realize that the passive device has performed the corresponding operation immediately.

The above procedures are illustrated by referring to a single passive device. It is noted that the control system of the present invention is not limited to control the single passive device. The control system with plural passive devices will be illustrated as follows.

Figure 4:
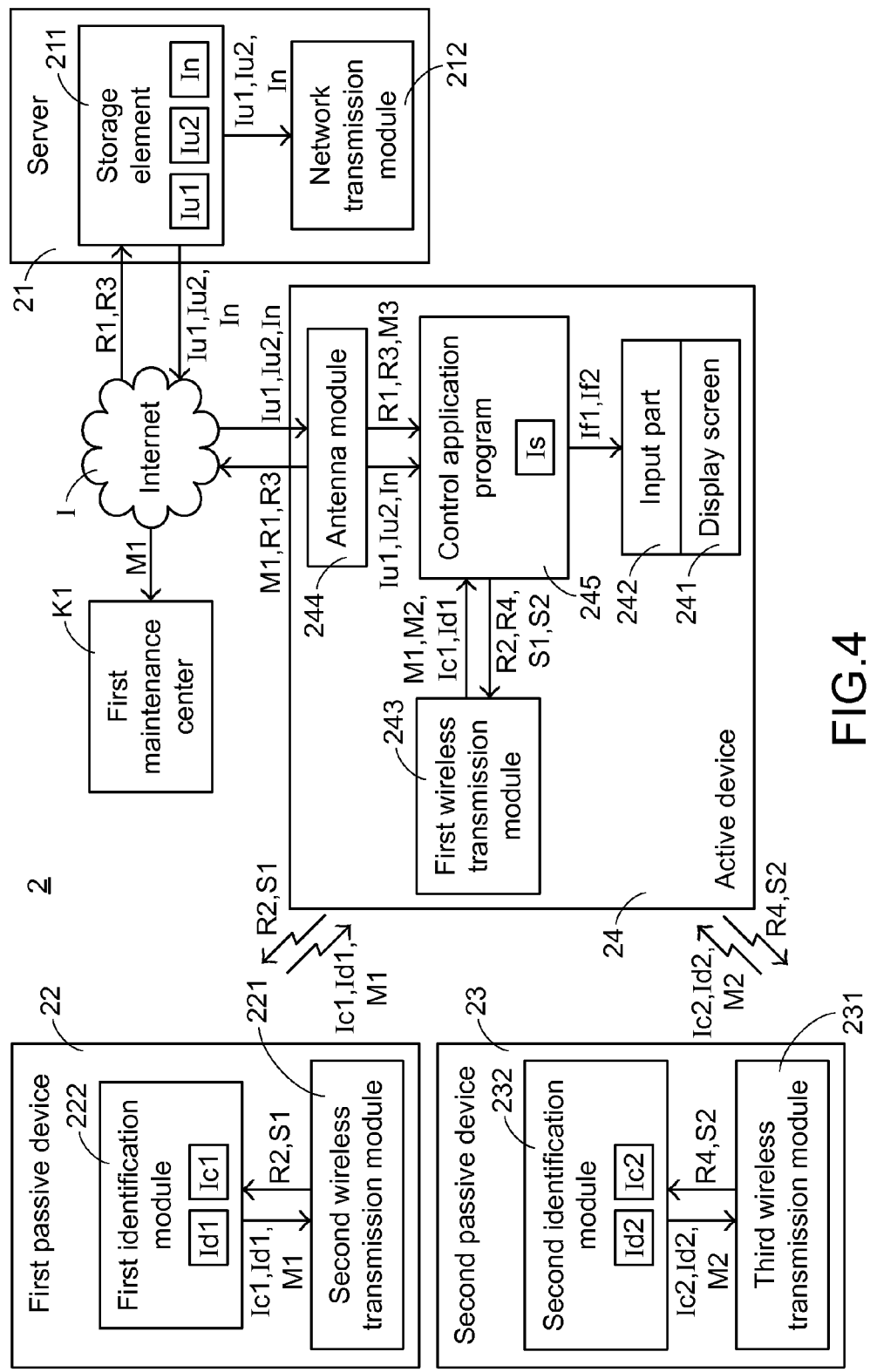
FIG. 4 is a schematic functional block diagram illustrating the architecture of a control system according to a second embodiment of the present invention.

The present invention further provides a second embodiment, which is distinguished from the first embodiment. FIG. 4 is a schematic functional block diagram illustrating the architecture of a control system according to a second embodiment of the present invention. As shown in FIG. 4, the control system 2 comprises a server 21, a first passive device 22, a second passive device 23 and an active device 24. The server 21 comprises a storage element 211 and a network transmission module 212. A first operation interface information Iu1 corresponding to the first passive device 22, a second operation interface information Iu2 corresponding to the second passive device 23 and an update interface information In are stored in the storage element 211. The network transmission module 212 is connected with the storage element 211. The network transmission module 212 is in communication with the active device 24 through network connection. The active device 24 is wirelessly connected with the first passive device 22 and second passive device 23, and connected with the server 21 through network connection. In this embodiment, the active device 24 comprises a display screen 241, an input part 242, a first wireless transmission module 243, an antenna module 244 and a control unit (not shown). The control unit may execute a control application program 245.

The first passive device 22 comprises a second wireless transmission module 221 and a first identification module 222. A first communication identification information Ic1 and a first device information Id1 are previously stored in the first identification module 222. Moreover, the first passive device 22 is programmed to output one first communication identification information Ic1 at a first specified time interval through the first identification module 222. The second passive device 23 comprises a third wireless transmission module 231 and a second identification module 232. A second communication identification information Ic2 and a second device information Id2 are previously stored in the second identification module 232. Moreover, the second passive device 23 is programmed to output one second communication identification information Ic2 at a second specified time interval through the second identification module 232. In this embodiment, the first passive device 22 is a washing machine, and the second passive device 23 is a stereo device.

Except that the control system 2 of this embodiment further comprises the second passive device 23 and the following four aspects, the architecture of the control system 2 is substantially identical to the architecture of the control system of the first embodiment. Firstly, an address information Is corresponding to the server 21 is previously stored in the control application program 245 of this embodiment. In other words, the first device information Id1 in the first identification module 222 only contains a first device identification information corresponding to the first passive device 22 and a first current status information corresponding to the first passive device 22, but the first device information Id1 does not contain the address information Is corresponding to the server 21. Similarly, the second device information Id2 in the second identification module 232 of the second passive device 23 only contains a second device identification information corresponding to the second passive device 23 and a second current status information corresponding to the second passive device 23, but the second device information Id2 does not contain the address information Is corresponding to the server 21.

Secondly, the server 21 further stores the update interface information In corresponding to the second passive device 23. The function and operation of the update interface information In will be illustrated as follows.

Thirdly, the first wireless transmission module 243 is a near field communication (NFC) transmission module. Moreover, the second wireless transmission module 221 and the third wireless transmission module 231 are also NFC transmission modules, but are not limited thereto.

Fourthly, in this embodiment, the first identification module 222 also contains a first control module (not shown), and the second identification module 232 also contains a second control module (not shown). That is, the first identification module 222 is the combination of the identification module and the control module of the first embodiment, and the identification module and the control module are integrated into a control circuit or a control chip. The functions and constituents of the second identification module 232 are similar to those of the first identification module 222, and are not redundantly described herein.

Figure 5:
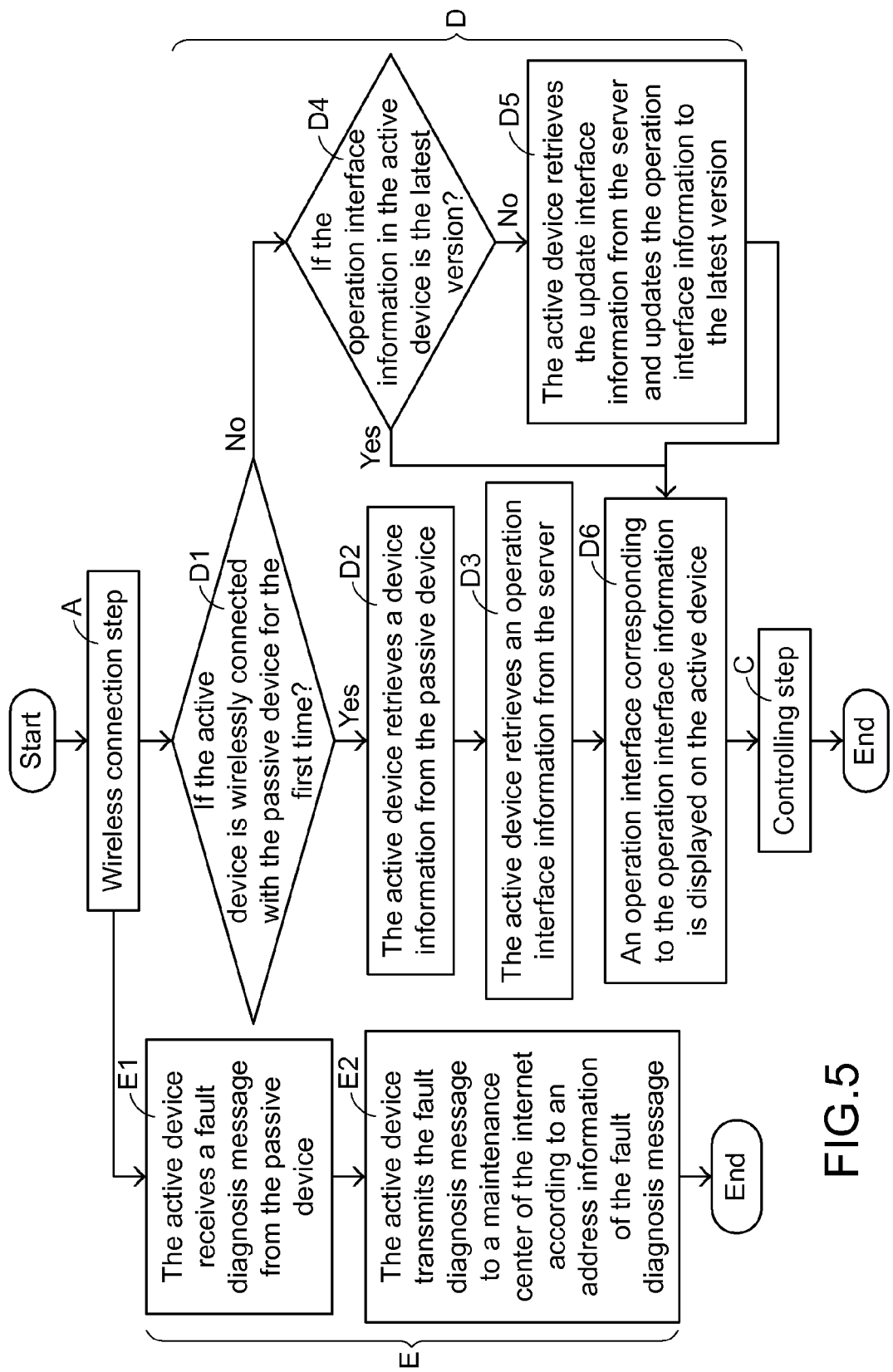
FIG. 5 is a flowchart illustrating a passive device control method according to a second embodiment of the present invention.

Hereinafter, a passive device control method according to a second embodiment of the present invention will be illustrated with reference to FIG. 5. FIG. 5 is a flowchart illustrating a passive device control method according to a second embodiment of the present invention. The passive device control method of the present invention comprises a wireless connection step A, an operation interface acquiring step D, a controlling step C and a fault diagnosis step E. The procedures of the wireless connection step A and the controlling step C are similar to those of the first embodiment, and are not redundantly described herein. Consequently, only the different operation interface acquiring step D and the additional fault diagnosis step E will be illustrated as follows.

The operation interface acquiring step D comprises the following steps D1, D2, D3, D4, D5 and D6. The step D1 is performed to judge whether the active device is wirelessly connected with the passive device for the first time. In the step D2, the active device retrieves a device information from the passive device. In the step D3, the active device retrieves an operation interface information from the server. The step D4 is performed to judge whether the operation interface information in the active device is the latest version. In the step D5, the active device retrieves the update interface information from the server and updates the operation interface information to the latest version. In the step D6, an operation interface corresponding to the operation interface information is displayed on the active device.

The fault diagnosis step E comprises the steps E1 and E2. In the step E1, the active device receives a fault diagnosis message from the passive device. In the step E2, the active device transmits the fault diagnosis message to a maintenance center of the internet according to an address information of the fault diagnosis message.

If the judging result of the step D1 indicates that the active device is wirelessly connected with the passive device for the first time, the step D2 will be performed. Whereas, if the judging result of the step D1 indicates that the active device is wirelessly connected with the passive device not for the first time, the step D4 will be performed. If the judging result of the step D4 indicates that the operation interface information is the latest version, the step D6 will be performed. Whereas, if the judging result of the step D4 indicates that the operation interface information is not the latest version, the step D5 will be performed.

Figure 6:
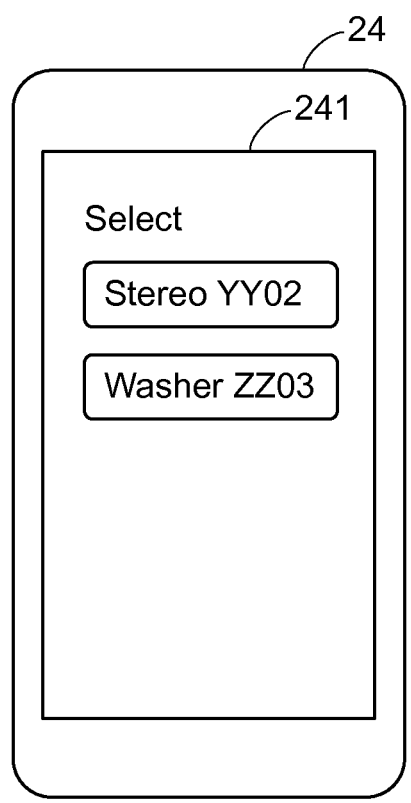
FIG. 6 schematically illustrates plural device names to be selected and displayed on the active device of the control system according to the second embodiment of the present invention.

The operations of the passive device control method of the present invention will be illustrated in more details as follows. Please refer to FIGS. 4 and 5. After the active device 24 is activated by the user, the control application program 245 performs the step A1 of controlling the active device 24 to search all passive devices near the active device 24 through the first wireless transmission module 243. As mentioned above, the first communication identification information Ic1 is periodically outputted from the first identification module 222, and the second communication identification information Ic2 is periodically outputted from the second identification module 232. Consequently, during the searching process, the first wireless transmission module 243 can receive the first communication identification information Ic1 and the second communication identification information Ic2. Moreover, the first communication identification information Ic1 and the second communication identification information Ic2 are transmitted to the control application program 245, and the first communication identification information Ic1 and the second communication identification information Ic2 are read by the control application program 245. Then, the device name in the first communication identification information Ic1 (e.g. "Stereo YY02") and the device name in the second communication identification information Ic2 (e.g. "Washer ZZ03") are displayed on the display screen 241 under control of the control application program 245. That is, the step A2 is performed. The contents displayed on the display screen 241 are shown in FIG. 6.

If the user wants to control the first passive device 22, the user may perform a select operation of selecting the device name of the first passive device 22 via the input part 242. In response to the select operation of the user, the control application program 245 controls the first wireless transmission module 243 to be wirelessly connected with the second wireless transmission module 221. Consequently, the wireless connection between the active device 24 and the first passive device 22 is established. That is, the step A3 is performed. Meanwhile, the wireless connection step A is completed.

Figure 7:
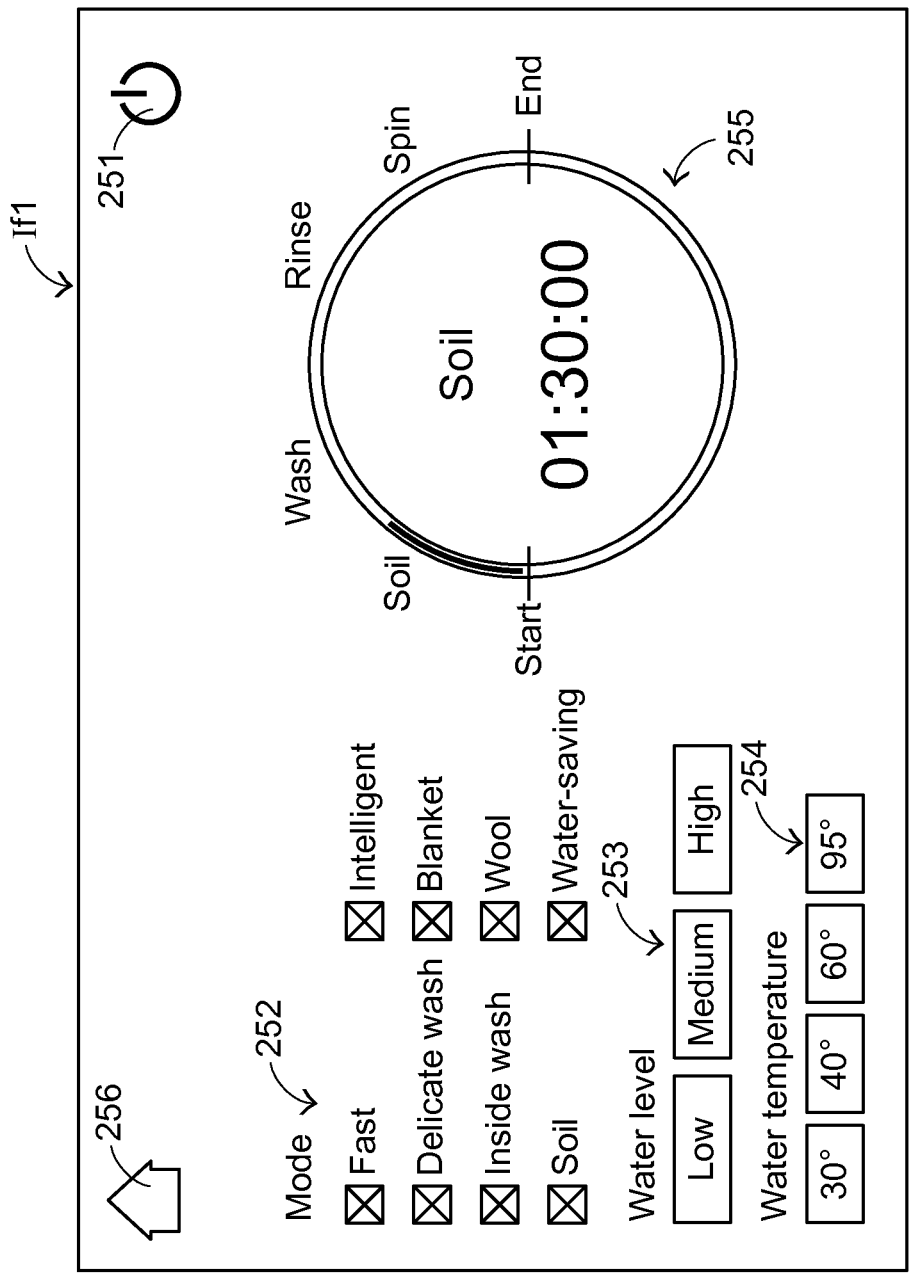
FIG. 7 schematically illustrates a first operation interface displayed on the active device of the control system according to the second embodiment of the present invention.

Then, the control application program 245 performs the operation interface acquiring step D. Please refer to FIGS. 4, 5, 6 and 7. FIG. 7 schematically illustrates a first operation interface displayed on the active device of the control system according to the second embodiment of the present invention. Firstly, the control application program 245 performs the step D1 of judging whether the active device 24 is wirelessly connected with the first passive device 22 for the first time. It is assumed that the active device 24 is wirelessly connected with the first passive device 22 for the first time. Consequently, the step D2 will be performed. In the step D2, a first retrieve request R1 corresponding to the first device information Id1 is outputted from the control application program 245 to the first passive device 22 through the first wireless transmission module 243. On the other hand, after the first retrieve request R1 is received by the first passive device 22, the first device information Id1 is transmitted from the first identification module 222 to the active device 24 through the second wireless transmission module 221. The first device information Id1 contains the first device identification information corresponding to the first passive device 22 and the first current status information corresponding to the first passive device 22, but does not contain the address information Is corresponding to the server 21.

Then, the step D3 is performed. According to the first device identification information corresponding to the first passive device 22 and the default address information Is of the server 21, a second retrieve request R2 corresponding to the first operation interface information Iu1 is transmitted from the antenna module 244 to the server 21 under control of the control application program 245. The second retrieve request R2 contains the first device identification information of the first passive device 22. The first device identification information contains a universally unique identifier (UUID) of the first passive device 22 and a first product serial number that is assigned to the first passive device 22 by the manufacturer. On the other hand, after the server 21 receives the second retrieve request R2, the server 21 can realize the first product serial number that is assigned to the first passive device 22 by the manufacturer according to the first device identification information of the first passive device 22. Consequently, the first operation interface information Iu1 corresponding to the first passive device 22 is searched from the storage element 211 by the server 21, and the first operation interface information Iu1 is transmitted to the active device 24 through the network transmission module 212. The first operation interface information Iu1 contains a first operation interface If1 corresponding to the first passive device 22 and associated information.

After the control application program 245 receives the first operation interface information Iu1, the control application program 245 performs the step D6. In the step D6, the control application program 245 reads the first operation interface information Iu1. Consequently, the control application program 245 acquires the first operation interface If1 corresponding to the first passive device 22 and controls the display screen 241 to display the first operation interface If1. At the same time, the first current status information corresponding to the first passive device 22 is also displayed on the first operation interface If1. The contents of the first operation interface If1 are shown in FIG. 7. Meanwhile, the operation interface acquiring step D is completed. Afterwards, in response to the user's input operation on the first operation interface If1, the control application program 245 performs the controlling step C. That is, in response to the user's input operation on the first operation interface If1, the active device 23 issues an input signal S to the first passive device 22. According to the input signal S, the first passive device 22 is controlled to perform the corresponding operation.

A method of operating the first operation interface If1 by the user will be illustrated as follows. Please refer to FIG. 7 again. The first operation interface If1 contains a power option 251, a mode status field 252, a water level setting field 253, a water temperature setting field 254, a wash cycle status field 255 and a home option 256. The function of the power option 251 is similar to a power switch. By tapping the power option 251, the first passive device 22 is controlled to be turned on or turned off. The mode status field 252 provides plural operation modes to be selected by the user, so that the first passive device 22 is controlled to be operated in the selected operation mode. For example, these operation modes contain a quick mode, an intelligent mode, a delicate mode, a blanket mode, . . . , and so on. The water level setting field 253 provides plural water level options to be selected by the user according to the laundry load size. The water temperature setting field 254 provides plural water temperature options to be selected by the user. The current operation status of the first passive device 22 and the remaining time till the end of the wash are displayed on the wash cycle status field 255. When the home option 256 is tapped by the user, the first operation interface If1 is returned to the home screen as shown in FIG. 6. Consequently, the user can select the device name corresponding to the second passive device 23.

Consequently, by tapping or triggering the plural options 251~256 of the first operation interface If1 through the input part 242, a corresponding first input signal S1 is transmitted to the first passive device 22. According to the first input signal S1, the first passive device 22 performs the corresponding operation. That is, the controlling step C is performed.

As mentioned above, if the home option 256 is tapped by the user, the first operation interface If1 is returned to the home screen as shown in FIG. 6. Meanwhile, if the device name corresponding to the corresponding to the second passive device 23 is selected by the user, the control application program 245 interrupts the wireless connection between the active device 24 and the first passive device 22. Moreover, the step A3 is performed, so that the wireless connection between the active device 24 and the second passive device 23 is established. It is assumed that the active device 24 is wirelessly connected with the second passive device 23 for the first time. Then, the control application program 245 performs the steps D1 and D2. Consequently, a third retrieve request R3 corresponding to the second device information Id2 is outputted from the control application program 245 to the second passive device 23 through the first wireless transmission module 243. In response to the third retrieve request R3, the second device information Id2 is acquired by the active device 24. Then, the control application program 245 performs the step D3. Consequently, a fourth retrieve request R4 corresponding to the second operation interface information Iu2 is transmitted from the antenna module 244 to the server 21 under control of the control application program 245. In response to the fourth retrieve request R4, a second operation interface If2 corresponding to the second passive device 23 is acquired by the control application program 245. Consequently, in the step D6, the second operation interface If2 is displayed on the display screen 241.

Figure 8:
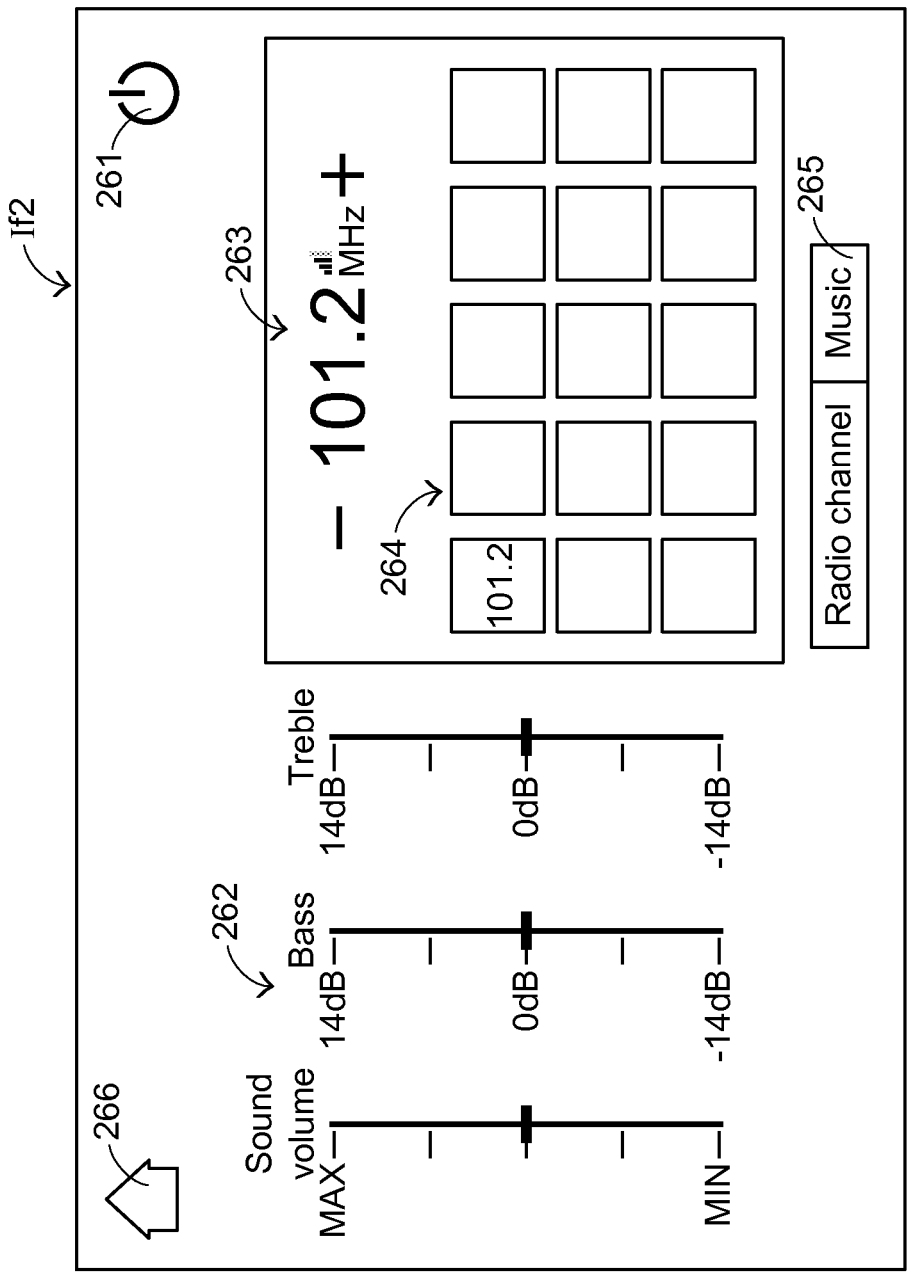
FIG. 8 schematically illustrates a second operation interface displayed on the active device of the control system according to the second embodiment of the present invention.

FIG. 8 schematically illustrates a second operation interface displayed on the active device of the control system according to the second embodiment of the present invention. As shown in FIG. 8, the second operation interface If2 contains a power option 261, a sound setting field 262, an operation status field 263, a radio station selection field 264, a switching option 265 and a home option 266. By tapping the power option 261, the second passive device 23 is controlled to be turned on or turned off. Through the sound setting field 262, the user can set the sound volume, the bass strength and the treble strength. The radio station channel or the name of music is displayed on the operation status field 263. The operation status field 263 provides setting options to be selected by the user to control the radio station channel or the name of music. The radio station selection field 264 provides plural favorite channel options for the user to set and select the favorite radio station channels. For example, the user may set the channel "101.2" as the favorite radio station channel and provide a specified key corresponding to the channel "101.2". For example, if the user taps the key corresponding to the channel "101.2", the second passive device 23 is connected with the radio station channel "101.2" to play the corresponding broadcasting content. By tapping the switching option 265, the operation mode is switched between the radio station mode and the music mode. When the home option 266 is tapped by the user, the second operation interface If2 is returned to the home screen as shown in FIG. 6.

Consequently, by tapping or triggering the plural options 261~266 of the second operation interface If2 through the input part 242, a corresponding second input signal S2 is transmitted to the second passive device 23. According to the second input signal S2, the second passive device 23 performs the corresponding operation. That is, the controlling step C is performed.

As mentioned above, after the wireless connection step A is completed, the control system 2 performs the operation interface acquiring step D. Moreover, in this embodiment, the control system 2 further performs the fault diagnosis step E at the same time. Moreover, the first identification module 222 is programmed to perform the fault diagnosis operation on the first passive device 22 at a third specified time interval and output a corresponding first fault diagnosis message M1 to the active device 24. If the fault diagnosis result of the first identification module 222 indicates that the first passive device 22 is fault-free, the first identification module 222 temporarily ceases outputting the first fault diagnosis message M1 once. The first fault diagnosis message M1 contains an address information of a first maintenance center of the internet I, wherein the first maintenance center is built by the manufacturer of the first passive device 22. Similarly, the second identification module 232 is programmed to perform the fault diagnosis operation on the second passive device 23 at a fourth specified time interval and output a corresponding second fault diagnosis message M2 to the active device 24.

If the fault diagnosis result of the second identification module 232 indicates that the second passive device 23 is fault-free, the second identification module 232 temporarily ceases outputting the second fault diagnosis message M2 once. The second fault diagnosis message M2 contains an address information of a second maintenance center of the internet I, wherein the second maintenance center is built by the manufacturer of the second passive device 23.

If the fault diagnosis result of the first identification module 222 indicates that a motor of the first passive device 22 has failure, the first fault diagnosis message M1 corresponding to the failed motor is transmitted from the first identification module 222 to the active device 24. Then, the first fault diagnosis message M1 from the first identification module 222 is received by the active device 24 by the wireless transmission technology. That is, the step E1 is performed. According to the first fault diagnosis message M1, the control application program 245 reads the address information of the first fault diagnosis message M1. Consequently, the first fault diagnosis message M1 is transmitted to the first maintenance center K1 of the internet I through the antenna module 244. That is, the step E2 is performed. After the first fault diagnosis message M1 is received by the first maintenance center K1, the customer service officer of the first maintenance center K1 may realize the failed condition of the first passive device 22 according to the content of the first maintenance center K1 and inform the user of sending the first passive device 22 to a real maintenance center corresponding to the first maintenance center K1 so as to be repaired. If the failed condition is not very serious, the customer service officer may provide the manual troubleshooting procedure to the user. Under this circumstance, the user can repair the first passive device 22 without the need of reading the instructions of the first passive device 22.

In another embodiment, after the content of the first fault diagnosis message is received by a computer system of the first maintenance center, the computer system of the first maintenance center can realize the failed condition of the first passive device and search the corresponding troubleshooting procedure information from a database of the computer system. Then, the troubleshooting procedure information is transmitted from the computer system to the active device by the network transmission technology. Consequently, the user can repair the first passive device while watching the troubleshooting procedure information on the display screen. If the failed condition of the first passive device cannot be self-repaired by the user, the computer system of the first maintenance center may issue a maintenance notification message to the active device. After the maintenance notification message is received, the user may send the first passive device to the real maintenance center. Consequently, the labor cost and the time cost about the communication between the customer service officer and the user are both increased.

Moreover, if the second operation interface If2 corresponding to the second passive device 23 is not the latest version and the active device 24 is wirelessly connected with the second passive device 23 again, the following procedures will be performed. After the wireless connection step A is performed and the active device 24 is wirelessly connected with the second passive device 23 again, the operation interface acquiring step D is performed. In the step D1, the control application program 245 judges that the active device 24 is wirelessly connected with the second passive device 23 not for the first time. Consequently, the control application program 245 performs the step D4 of judging whether the second operation interface information Iu2 is the latest version. Since the control application program 245 judges that the second operation interface information Iu2 is the latest version, the control application program 245 performs the step D5. In the step D5, the update interface information In corresponding to the second passive device 23 is retrieved from the server 21 according to the address information Is. After the control application program 245 retrieves the update interface information I, the second operation interface information Iu2 is updated to the latest version. Then, in the step D6, the second operation interface If2 corresponding to the latest version the second operation interface information Iu2 is displayed on the display screen 241.

Similarly, by tapping or triggering the second operation interface If2 through the input part 242, a corresponding second input signal S2 is transmitted to the second passive device 23. According to the second input signal S2, the second passive device 23 performs the corresponding operation. That is, the controlling step C is performed. Meanwhile, the passive device control method of the present invention is completed.

In the above embodiment, the active device 24 of the control system 2 is wirelessly connected with one passive device at a time. That is, if the user wants to establish the wireless connection between the active device 24 and the second passive device 23, the user has to disconnect the wireless connection between the active device 24 and the first passive device 22. It is noted that numerous modifications and alterations may be made while retaining the teachings of the invention. For example, in another embodiment, if the first wireless module of the active device has the sufficient wireless connection capability, the active device can be wirelessly connected with the first passive device and the second passive device simultaneously.

It is noted that the fault diagnosis step E has to be performed after the wireless connection step A. However, the sequence of the fault diagnosis step E and the operation interface acquiring step D and the controlling step C is not restricted. That is, the fault diagnosis step E may be performed before the operation interface acquiring step D or after the operation interface acquiring step D; or the fault diagnosis step E may be performed after the controlling step C. Consequently, the timing of performing the fault diagnosis step E may be determined or changed according to the setting of the manufacturer.

Figure 9:
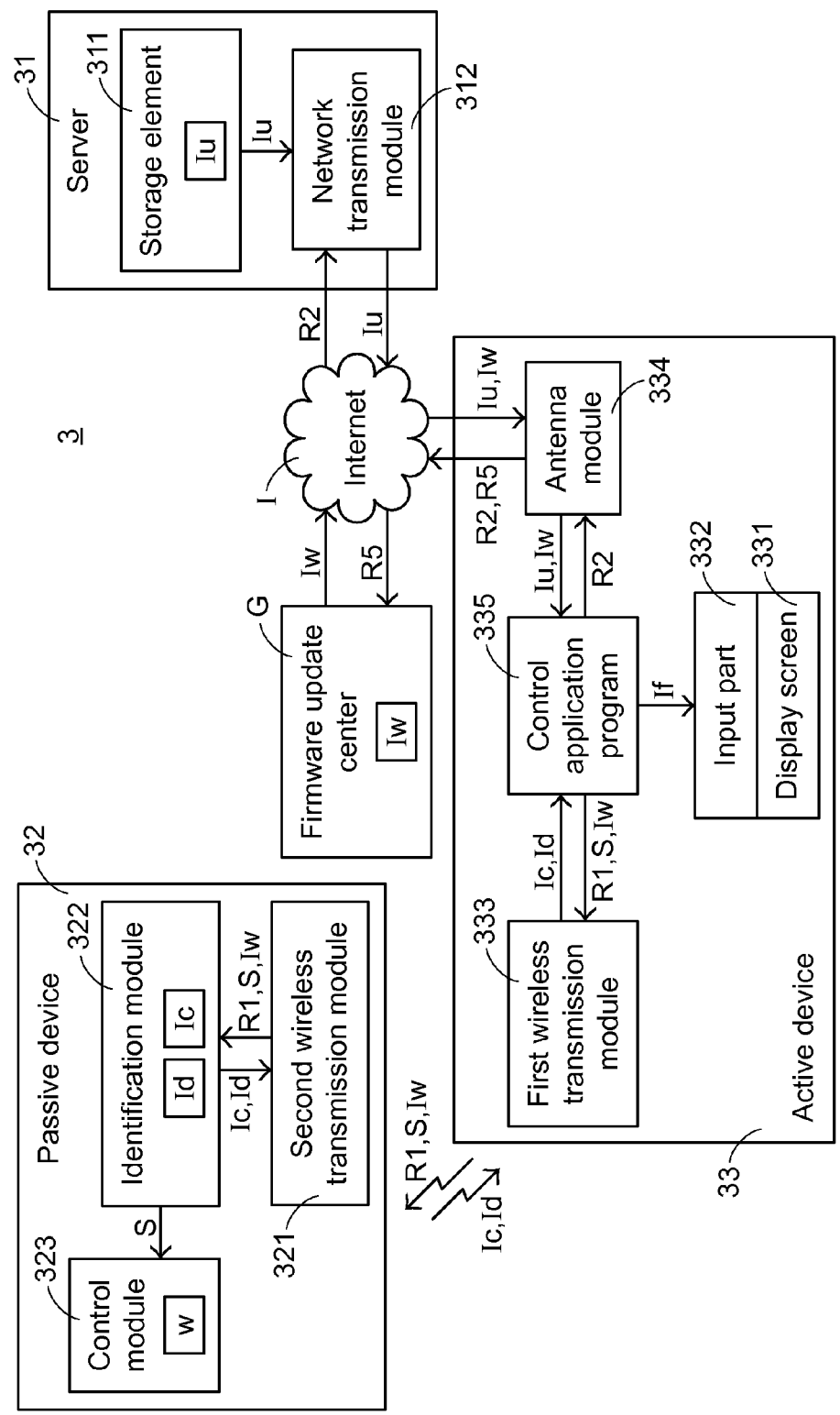
FIG. 9 is a schematic functional block diagram illustrating the architecture of a control system according to a third embodiment of the present invention.

The present invention further provides a third embodiment, which is distinguished from the first embodiment. FIG. 9 is a schematic functional block diagram illustrating the architecture of a control system according to a third embodiment of the present invention. As shown in FIG. 9, the control system 3 comprises a server 31, a passive device 32 and an active device 33. A communication identification information Ic and a device information Id are previously stored in the passive device 32. The server 31 comprises a storage element 311 and a network transmission module 312. In this embodiment, the active device 33 comprises a display screen 331, an input part 332, a first wireless transmission module 333, an antenna module 334 and a control unit (not shown). The control unit may execute a control application program 335. The passive device 32 comprises a second wireless transmission module 321, an identification module 322 and a control module 323. Except for the following aspects, the other components of the control system 3 of this embodiment are substantially identical to those of the control system 1 of the first embodiment. Component parts and elements corresponding to those of the first embodiment are not redundantly described herein. In comparison with the control system 1 of the first embodiment, the active device 33 can be connected with an internet I through the antenna module 334, and the active device 33 can be connected with a firmware update center G through the internet I. A firmware update information Iw is stored in the firmware update center G. Moreover, the control module 323 of the passive device 32 contains a firmware W. It is noted that the control module 123 of the passive device 12 of the first embodiment also contain a firmware and each of the first identification module 222 and the second identification module 223 also contains a firmware. Since no firmware update operation is performed by the control systems of the above two embodiments, the firmware update procedure is not described in the above two embodiments.

Figure 10:
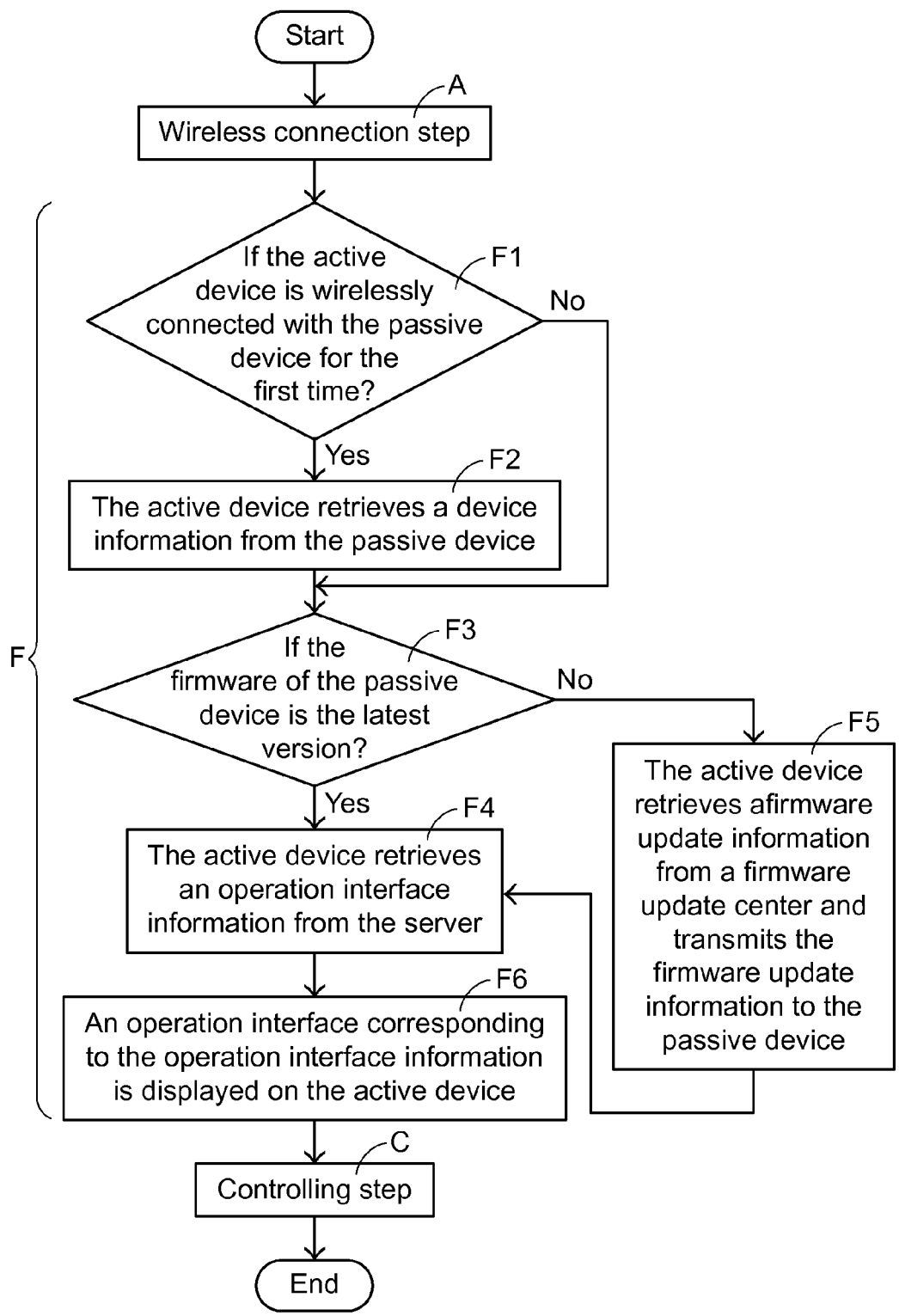
FIG. 10 is a flowchart illustrating a passive device control method according to a third embodiment of the present invention.

Hereinafter, a passive device control method according to a second embodiment of the present invention will be illustrated with reference to FIG. 10. FIG. 10 is a flowchart illustrating a passive device control method according to a third embodiment of the present invention. The passive device control method of the present invention comprises a wireless connection step A, an operation interface acquiring step F and a controlling step C. The procedures of the wireless connection step A and the controlling step C are similar to those of the first embodiment, and are not redundantly described herein. Consequently, only the different operation interface acquiring step F will be illustrated as follows.

The operation interface acquiring step F comprises the following steps F1, F2, F3, F4, F5 and F6. The step F1 is performed to judge whether the active device is wirelessly connected with the passive device for the first time. In the step F2, the active device retrieves a device information from the passive device. The step F3 is performed to judge whether the firmware in the active device is the latest version. In the step F4, the active device retrieves an operation interface information from the server. In the step F5, the active device retrieves the firmware update information from the firmware update center and transmits the firmware update information to the passive device. In the step F6, an operation interface corresponding to the operation interface information is displayed on the active device.

If the judging result of the step F1 indicates that the active device is wirelessly connected with the passive device for the first time, the step F2 is performed. Whereas, if the judging result of the step F1 indicates that the active device is wirelessly connected with the passive device not for the first time, the step F3 will be performed. If the judging result of the step F3 indicates that the firmware is the latest version, the step F4 will be performed. Whereas, if the judging result of the step F3 indicates that the firmware is not the latest version, the step F5 will be performed.

The operations of the passive device control method of the present invention will be illustrated in more details as follows. Please refer to FIGS. 9 and 10. After the active device 33 is activated by the user, the control application program 335 performs the wireless connection step A of establishing the wireless connection between the active device 33 and the passive device 32. The procedures of the wireless connection step A are identical to those of the first embodiment, and are not redundantly described herein. Then, the control application program 335 performs the operation interface acquiring step F. In the step F1, the control application program 335 judges whether the active device 33 is wirelessly connected with the first passive device 32 for the first time. If the control application program 335 judges that the active device 33 is wirelessly connected with the first passive device 32 for the first time, the control application program 335 will perform the step F2. Then, the step F3 is performed to judge whether the firmware in the active device is the latest version. If the judging condition of the step F3 is satisfied, the control application program 335 performs the step F4 and the step F6 sequentially. Consequently, by tapping or triggering the operation interface If through the input part 332, a corresponding input signal S is transmitted to the passive device 32. According to the input signal S, the passive device 32 performs the corresponding operation. That is, the controlling step C is performed.

On the other hand, if the control application program 335 judges that the firmware in the active device is not the latest version in the step F3, the control application program 335 will perform the step F5. In the step F5, the active device 33 is connected with the firmware update center G through network connection according to the address information corresponding to the firmware update center G and contained in the device information Id, and the control application program 335 control the antenna module 334 to output a fifth retrieve request R5 corresponding to the firmware update information Iw. The fifth retrieve request R5 is transmitted to the firmware update center G through the internet I. In response to the fifth retrieve request R5, the control application program 335 retrieves the firmware update information Iw corresponding to the firmware W of the passive device 32. After the firmware update information Iw is retrieved by the active device 33, the firmware update information Iw is transmitted to the passive device 32 through the first wireless transmission module 333. According to the firmware update information Iw, the firmware W of the passive device 32 can be updated. After the step F5, the control application program 335 performs the step F4 and the step F6 sequentially. Then, the controlling step C is performed. The procedures of the controlling step C are similar to those as mentioned above, and are not redundantly described herein. Meanwhile, the passive device control method of the present invention is completed.

The following two aspects should be specially described. Firstly, in this embodiment, the firmware update information Iw is stored in the firmware update center G It is noted that numerous modifications and alterations may be made while retaining the teachings of the invention. For example, in another embodiment, the firmware update information is stored in the server. Secondly, in this embodiment, the step F3 of judging whether the firmware is the latest version is performed after the step F2. It is noted that the timing of performing the step F3 is not restricted. For example, in another embodiment, the step F3 of judging whether the firmware is the latest version is performed after the step F6. If the judging result of the step F3 indicates that the firmware is the latest version, the step C will be performed. Whereas, if the judging result of the step F3 indicates that the firmware is not the latest version, the step F5 and the controlling step C will be sequentially performed. That is, this approach combines the operation interface acquiring step B of the first embodiment and the steps F3 and F5 of the firmware update process. Moreover, another approach may combine the operation interface acquiring step D of the second embodiment and the steps F3 and F5 of the firmware update process. Under this circumstance, not only the firmware but also the operation interface can be automatically updated.

From the above descriptions, the present invention provides the control system and the passive device control method. The operation interface data of plural passive devices are previously stored in the server. Moreover, each of the plural passive devices outputs a corresponding communication identification information at a specified time interval. According to the communication identification information, the wireless connection between the active device and the corresponding passive device is established. Then, the active device acquires the device information of the passive device that is connected with the active device. According to the data of the device information, the active device retrieves the corresponding operation interface information from the server. Consequently, the corresponding operation interface is displayed on the active device. The user may operate the operation interface to control the passive device. In accordance with the present invention, it is not necessary to install a control panel or a control button on the passive device, and the user may operate the operation interface of the active device to control the passive device. As previously described, the conventional home appliance to be controlled by the active device should have the network connection function. Since the active device is wirelessly connected with the passive device by the wireless transmission technology according to the present invention, the passive device does not need to have the network connection function. That is, the control system and the passive device control method of the present invention are capable of controlling plural passive devices by only installing a control application program in the active device instead of installing plural application programs.

Moreover, the operation interface provided by the control system and the passive device control method of the present invention is similar to the control panel of the conventional home appliance. Consequently, the user can easily understand how to operate the operation interface. Since the control system of the present invention is not equipped with the control panel, the benefits of the present invention become more apparent. For example, the control panel of the conventional home appliance is unchangeable. If the manufacturer of the conventional home appliance wants to change the control panel, the manufacturer has to design the new control panel in the next generation home appliance. In other words, the fabricating cost is increased. In accordance with the control system of the present invention, the manufacturer only needs to change the content of the operation interface information and store the latest version of the operation interface information into the server. When the user operates the active device to acquire the latest version of the operation interface information, the new operation interface can be displayed on the active device.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A control system, comprising:
   a passive device having a communication identification information;
   a server storing an operation interface information corresponding to the passive device; and
   an active device wirelessly connected with the passive device and connected with the server through network connection, wherein the active device retrieves the operation interface information from the server according to a device information of the passive device, wherein the active device comprises a display screen and an input part, wherein an operation interface corresponding to the operation interface information is displayed on the display screen, and the passive device is controlled by the active device in response to an input operation on the input part.

2. The control system according to claim 1, wherein the active device further comprises:
   a first wireless transmission module wirelessly connected with the passive device by a wireless transmission technology, and receiving the communication identification information and the device information;
   an antenna module connected with the server through network connection by a network transmission technology, and receiving the operation interface information; and
   a control unit connected with the display screen, the input part, the first wireless transmission module and the antenna module, wherein a control application program is executed by the control unit to control operations of the display screen, the input part, the first wireless transmission module and the antenna module.

3. The control system according to claim 2, wherein after the control application program receives the communication identification information, the control application program controls the first wireless transmission module to be wirelessly connected with the passive device and retrieve the device information corresponding to the passive device from the passive device, wherein after the control application program receives the device information, the control application program controls the antenna module to be connected with the server through network connection and retrieve the operation interface information corresponding to the passive device from the server, wherein after the control application program receives the operation interface information, the control application program controls the display screen to display the operation interface corresponding to the operation interface information, wherein after the control application program receives an operating signal in response to the input operation on the input part, the control application program controls the first wireless transmission module to output an input signal corresponding to the operating signal, so that the passive device is correspondingly controlled.

4. The control system according to claim 2, wherein the device information contains a device identification information corresponding to the passive device, a current status information corresponding to the passive device and an address information corresponding to the server, wherein the control application program retrieves the operation interface information from the server according to the device identification information and the address information.

5. The control system according to claim 2, wherein an address information corresponding to the server is previously stored in the control application program, and the device information contains a device identification information corresponding to the passive device and a current status information corresponding to the passive device, wherein the control application program retrieves the operation interface information from the server according to the device identification information and the address information.

6. The control system according to claim 2, wherein the passive device comprises:
   a second wireless transmission module wirelessly connected with the first wireless transmission module by the wireless transmission technology, and outputting the communication identification information or receiving an input signal from the active device; and an identification module connected with the second wireless transmission module, wherein the communication identification information and the device information are previously stored in the identification module, wherein the identification module outputs the communication identification information at a specified time interval or the identification module outputs the device information in response to a retrieve request corresponding to the device information, wherein the retrieve request is outputted from the active device.

7. The control system according to claim 2, wherein the control system further comprises a second passive device, and the second passive device comprises:
   a third wireless transmission module wirelessly connected with the first wireless transmission module by the wireless transmission technology, and outputting a second communication identification information corresponding to the second passive device or receiving an input signal from the active device; and
   a second identification module connected with the third wireless transmission module, wherein the second communication identification information and a second device information are previously stored in the second identification module, wherein the second identification module outputs the second communication identification information at a specified time interval or the second identification module outputs the second device information in response to a retrieve request corresponding to the second device information, wherein the retrieve request is outputted from the active device.

8. The control system according to claim 7, wherein an update interface information corresponding to a second operation interface is stored in the server, wherein when the active device is wirelessly connected with the second passive device and the control application program judges that the second operation interface is not the latest version, the control application program retrieves the update interface information from the server, and the second operation interface is updated according to the update interface information.

9. A passive device control method, comprising steps of:
   performing a wireless connection step of allowing an active device to be wirelessly connected with the passive device according to a communication identification information;
   performing an operation interface acquiring step of:
      allowing the active device to retrieve an operation interface information corresponding to the passive device from a server through network connection according to a device information corresponding to the passive device; and
      allowing an operation interface corresponding to the operation interface information to be displayed on the active device; and
   performing a controlling step of allowing the active device to output an input signal in response to an input operation on the operation interface, wherein the passive device is controlled according to the input signal.

10. The passive device control method according to claim 9, wherein the wireless connection step comprises steps of:
   allowing the active device to search the passive device near the active device;
   displaying a device name of the searched passive device on the active device according to the communication identification information corresponding to the passive device;
   establishing wireless connection between the active device and the passive device; and
   allowing the active device to retrieve the device information corresponding to the passive device from the passive device.

11. The passive device control method according to claim 9, wherein before the active device retrieves the operation interface information corresponding to the passive device from the server through network connection according to the device information corresponding to the passive device, the operation interface acquiring step further comprises a step of judging whether the active device is wirelessly connected with the passive device for the first time, wherein if the active device is wirelessly connected with the passive device for the first time, the active device retrieves the operation interface information corresponding to the passive device from the server through network connection according to the device information corresponding to the passive device, wherein if the active device is wirelessly connected with the passive device not for the first time, the operation interface corresponding to the operation interface information is displayed on the active device.

12. The passive device control method according to claim 9, wherein before the active device retrieves the operation interface information corresponding to the passive device from the server through network connection according to the device information corresponding to the passive device, the operation interface acquiring step further comprises a step of judging whether the active device is wirelessly connected with the passive device for the first time, wherein if the active device is wirelessly connected with the passive device for the first time, the active device retrieves the operation interface information corresponding to the passive device from the server through network connection according to the device information corresponding to the passive device, wherein if the active device is wirelessly connected with the passive device not for the first time, the operation interface acquiring step further comprises a step of judging whether the operation interface information in the active device is the latest version, wherein if the operation interface information in the active device is the latest version, the operation interface corresponding to the operation interface information is displayed on the active device, wherein if the operation interface information in the active device is not the latest version, the active device retrieves the operation interface information from the server according to the device information corresponding to the passive device.

13. The passive device control method according to claim 9, wherein the step of allowing the active device to retrieve the operation interface information corresponding to the passive device from the server through network connection according to the device information corresponding to the passive device comprises steps of:
   allowing the active device to retrieve the device information corresponding to the passive device from the passive device, wherein the device information contains a device identification information corresponding to the passive device, a current status information corresponding to the passive device and an address information corresponding to the server; and
   allowing the active device to retrieve the operation interface information from the server according to the device identification information and the address information.

14. The passive device control method according to claim 9, wherein the step of allowing the active device to retrieve the operation interface information corresponding to the passive device from the server through network connection according to the device information corresponding to the passive device comprises steps of:
- allowing the active device to retrieve the device information corresponding to the passive device from the passive device, wherein the device information contains a device identification information corresponding to the passive device and a current status information corresponding to the passive device; and
- allowing the active device to retrieve the operation interface information from the server according to the device identification information and an address information previously stored in the active device.

15. The passive device control method according to claim 9, further comprises a fault diagnosis step after the wireless connection step, wherein the fault diagnosis step comprises steps of:
- receiving a fault diagnosis message from the passive device, wherein the fault diagnosis message contains an address information corresponding to a maintenance center; and
- transmitting the fault diagnosis message to the maintenance center in an internet according to the address information.

16. The passive device control method according to claim 9, wherein before the controlling step, the passive device control method further comprises a firmware update step of judging whether a firmware of the passive device is the latest version, wherein if the firmware of the passive device is not the latest version, the active device retrieves a firmware update information from a server or a firmware update center and transmits the firmware update information to the passive device, wherein if the firmware of the passive device is the latest version, the controlling step is performed.

17. The passive device control method according to claim 9, wherein before the active device retrieves the operation interface information corresponding to the passive device from the server through network connection according to the device information corresponding to the passive device, the operation interface acquiring step further comprises a step of judging whether the active device is wirelessly connected with the passive device for the first time, wherein if the active device is wirelessly connected with the passive device for the first time, the active device retrieves the operation interface information corresponding to the passive device from the server through network connection according to the device information corresponding to the passive device, wherein if the active device is wirelessly connected with the passive device not for the first time, the operation interface acquiring step further comprises a step of judging whether a firmware of the passive device is the latest version, wherein if the firmware of the passive device is the latest version, the active device retrieves the operation interface information from the server and the operation interface corresponding to the operation interface information is displayed on the active device, wherein if the firmware of the passive device is not the latest version, the active device retrieves a firmware update information from a server or a firmware update center and transmits the firmware update information to the passive device.

* * * * *